Feb. 3, 1959 M. W. POOLE 2,871,584
INTRAVENOUS THERAPY TRAINING AID
Filed March 25, 1957
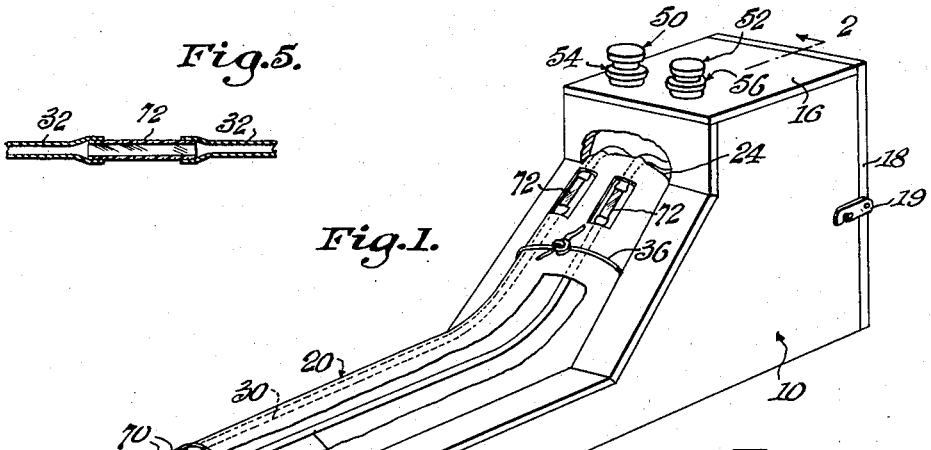
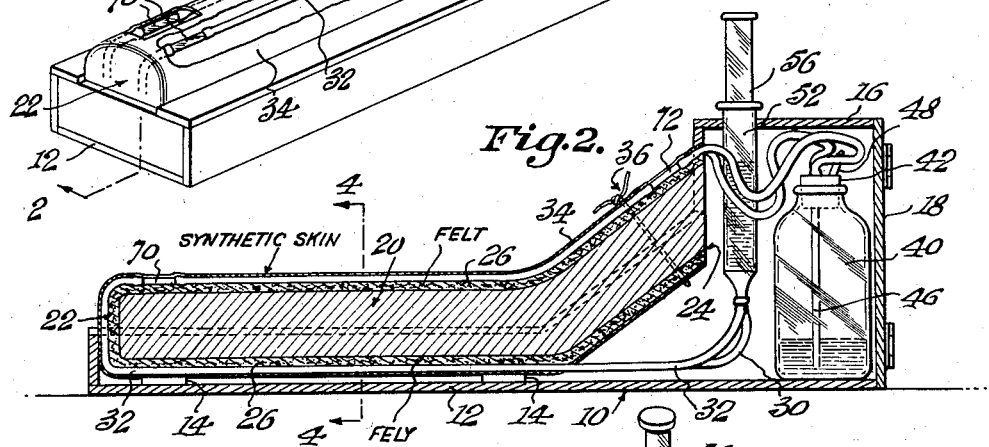
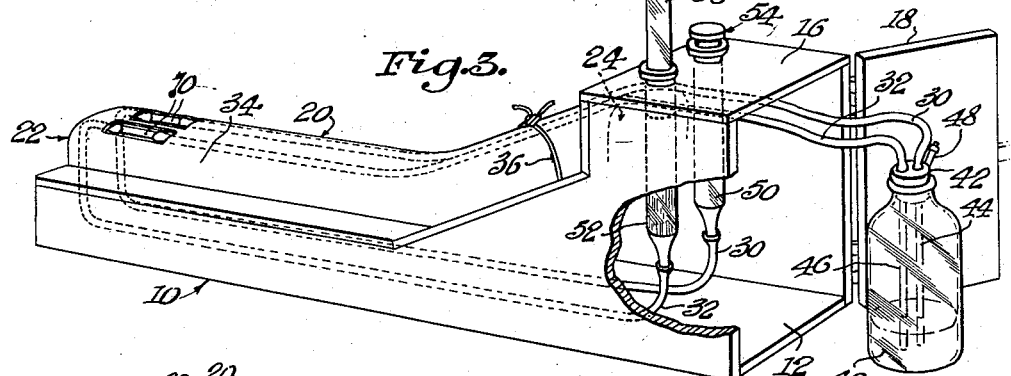
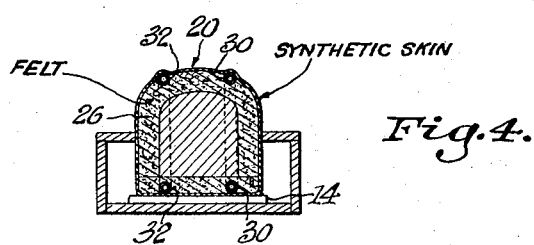
INVENTOR.
Marcus W. Poole
ATTORNEYS

United States Patent Office 2,871,584
Patented Feb. 3, 1959

2,871,584

INTRAVENOUS THERAPY TRAINING AID

Marcus W. Poole, United States Army

Application March 25, 1957, Serial No. 648,447

5 Claims. (Cl. 35—17)

(Granted under Title 35, U. S. Code (1952), sec. 266)

The invention described herein may be manufactured and used by or for the Government for governmental purposes without the payment of any royalty thereon.

This invention relates to intravenous injection and blood withdrawal training aids. More particularly, the invention refers to an improved device simulating a human arm having a rubber or latex tube therein which is included in an open system designed to permit the flow of fluid through the tube in a manner simulating the bodily flow of blood through veins. It has been found that the open system, hereinafter described, alleviates tube leakage found in training aids utilizing the closed system, i. e. tubes having a closed end. This leakage causes discoloring of the soft material utilized in the arm portion to support the tube. The open system also eliminates the air bleeding required of the closed system to fill the tube.

A principal object of the present invention is to provide a training arm for teaching intravenous therapy which has an open system of fluid flow through the training arm's simulated veins.

Another object of this invention is to provide a training arm having an open system of fluid flow which permits operators to perform without interruption a series of intravenous operations.

Still another object of the present invention is to provide a training arm having the above objects which permits continuous instruction in the theory and techniques of intravenous therapy under conditions closely simulating actual bodily conditions.

A further object of this invention is to provide a training arm having an open system of fluid flow which permits continuous use of the training arm for practice in either blood withdrawal or intravenous injection techniques.

Other objects and many of the attendant advantages of this invention will be appreciated readily as the same becomes better understood by reference to the following detailed description when considered in connection with the accompanying drawings wherein—

Fig. 1 is a perspective view of a device constructed in accordance with the teachings of the present invention;

Fig. 2 is a cross sectional view of the device taken along line 2—2 of Fig. 1;

Fig. 3 is a perspective view of the device having a portion of the housing cut away to disclose the syringe assembly in detail;

Fig. 4 is a vertical sectional view of the device taken along line 4—4 of Fig. 2; and Fig. 5 is a detailed sectional view of the viewing connector tube used in the present invention.

Referring now more specifically to the drawings, in which corresponding reference numerals represent corresponding parts in each of the several views, the embodiment of the invention illustrated therein comprises a housing 10 having a base 12 in the form of a flat plate adapted to rest upon a horizontal surface (Fig. 2). As shown in Figs. 2 and 4, a body member 20 is spaced upwardly from the base 12 by spacer members 14, and inwardly from the ends of the base 12. The body member 20 is shaped in the form of a portion of the anatomy, namely, the human forearm, terminating at ends 22 and 24 (Fig. 2). The body member 20 is made of wood or other form retaining material and preferably covered with a layer 26 of soft material such as felt (Figs. 2 and 4). This soft material 26 is provided with channels 28 adapted to receive loosely flexible conduits 30 and 32 of latex or other suitable material.

A skin-like diaphanous membrane 34, fabricated of vinyl resin or other suitable material, comfortably covers body member 20, layer 26, and conduits 30 and 32, to form therewith a simulated portion of the human forearm including veins. A rubber tourniquet 36 is carried by the completed body member adjacent to end 24 of the member (Figs. 1, 2, and 3). The conduits 30 and 32 have ends communicating with a drainage bottle 40. These ends are hereinafter referred to as the upper ends. The other or lower ends of conduits 30 and 32 communicate with a pair of reservoirs 50 and 52, which conveniently may be syringes having plungers 54 and 56, respectively, movable therein. The conduits 30 and 32 extend from the drainage bottle 40 along the upper surface of the body member 20, around end 22 of the body member to the lower surface of the body member and along this lower surface to the syringes 50 and 52 (Figs. 2 and 3), to form two independent open circulatory systems. The portions of the conduits 30 and 32 extending along the upper surface of the body member 20 are provided with transparent connectors 70 and 72 made of glass or other suitable material which may be viewed more clearly through openings provided in the membrane 34. The connectors are positioned adjacent to ends 22 and 24 (Figs. 1 and 2).

The housing 10 (Figs. 1, 2, and 3) is made of wood or any other suitable material and extends rearwardly beyond the body member 20 where it rises abruptly above end 24 of the body member 20. Reservoirs or syringes 50 and 52 are supported by top 16 of the housing 10 adjacent to end 24 of the body member 20 and have their outlet ends disposed within the housing 10, each in communication with a respective one of the lower ends of conduits 30 and 32. Door 18 is hingedly mounted to provide easy access to the interior of the housing, the door being normally retained by a latch or suitable fastener 19. The housing 10 is also adapted to receive the drainage bottle or container 40 as shown in Fig. 2. The drainage bottle is closed with a stopper 42 supporting a pair of hollow tubes 44 and 46 (Fig. 3) which may be of glass. The tubes extend from a point near the bottom of the drainage bottle and through the stopper where the ends communicate with the upper ends of conduits 30 and 32. The stopper 42 is also provided with an opening to permit air at atmospheric pressure to reach the surface of the liquid within the bottle. This passage may be provided by a hollow needle 48 piercing stopper 42.

The flow of simulated blood through the "veins" of my invention enables realistic training in the techniques of both intravenous injection and blood withdrawal not heretofore realized in the prior art static or closed systems.

To prepare the device for intravenous injection, the drainage bottle 40 is removed from the housing 10, and fluid, preferably colored to simulate blood, is introduced therein. The volume of fluid required should be sufficient to fill a conduit 30 or 32 and partially fill a syringe 50 or 52 while maintaining the ends of tubes 44 and 46 submerged when the apparatus is in condition for operation.

In operation, a syringe plunger 54 or 56 is lifted to fill its respective conduit and part of its respective syringe with fluid from the bottle positioned as in Figs. 2 or 3. Upon release of the plunger, the pressure resulting from the fluid in the syringe being elevated above the level of the fluid remaining in the drainage bottle, causes the fluid to flow from the syringe through the conduit into the drainage bottle.

During this return flow, a student may practice intravenous injection under realistic conditions. Before the plunger is released, tourniquet 36 is applied, causing distention of the conduit, as in actual practice. The intravenous needle (not shown) connected to a source of liquid to be injected, is then inserted into the distended conduit. The pressure in the conduit causes the "blood" to back up slightly into the intravenous needle, as it does in actual practice. The tourniquet is then released and the liquid to be injected flows through the intravenous needle into the conduit where it mixes with the now flowing "blood" and passes into the drainage bottle. By making the intravenous liquid of a color different from that of the "blood," the student can view the action taking place during the operation through transparent connectors 70 and 72.

The consecutive number of operations which may be performed is limited only by the size of the drainage bottle; however, as the drainage bottle can be replaced easily and quickly there is no actual limitation on the number of injections that can be performed on the demonstrating arm.

When used to teach blood withdrawal techniques, the apparatus is operated in a similar manner, the student merely using a syringe to withdraw "blood" from the system instead of the intravenous needle to supply liquid. As before, the fluid flow within the conduit causes distention of the conduit when the tourniquet is applied, simulating the natural condition. "Blood" may be added to the bottle 40 as needed during the course of the training period.

After the latex conduits have been punctured so as to prevent further use, the skin-like membrane may be removed and the portion of the conduit between connectors 70 and 72 replaced with a fresh length of tubing.

Although the present invention has been described in some detail for the purposes of complete understanding, it is understood that certain changes and modifications may be made within the spirit of the invention and scope of the appended claims.

Having thus described my invention, what I claim as new and wish to secure by Letters Patent is:

1. A medical training aid for practice of intravenous injection and blood withdrawal comprising a member shaped to resemble a part of a human body, a skin-like covering surrounding said member, a resilient conduit simulating a human vein arranged beneath said covering and along the length of said member, a drainage container having a fluid therein connected to said conduit, a syringe connected to said conduit for withdrawing fluid from said container through said conduit, and means mounted on said member for stopping the return flow of fluid from said syringe into said container.

2. A medical training aid for practice of intravenous injection and blood withdrawal comprising a base, a member simulating a human arm mounted on said base, a skin-like material covering said member, a flexible conduit simulating a human blood vessel arranged beneath said material and disposed along the length of said member, a syringe mounted in said base at one end of said member and connected to said conduit, a drainage bottle containing a fluid connected to said conduit and so arranged that upon operation of the syringe, fluid is introduced into said syringe to a level above that of the fluid level within the bottle.

3. The device of claim 2 further comprising a tourniquet mounted on said base for constricting said member to prevent fluid flow from said syringe to said bottle.

4. An intravenous therapy training aid comprising a base, a box-like structure mounted on one end of said base and having top and side walls, a member shaped to simulate a human arm mounted on said base, one end of said member abutting a side wall of said structure, a flexible conduit simulating a human vein disposed along said member, a skin-like membrane covering said member and said conduit, a syringe having an output end and a plunger mounted in the other end rigidly supported by said top wall in a vertical position, the output end thereof being disposed within said structure above said base, means connecting said conduit with the output end of said syringe for fluid flow therebetween, a drainage bottle containing a fluid simulating human blood, and means connecting said conduit to said bottle for fluid flow therebetween, said drainage bottle being so disposed with respect to said syringe that upon operation of said plunger, fluid is drawn into said syringe to a level which results in reverse flow back through said conduit into said bottle when the plunger is released.

5. The apparatus of claim 4 further comprising a flexible element mounted on said base for constricting said conduit to prevent fluid flow therethrough.

References Cited in the file of this patent

UNITED STATES PATENTS

| | | |
|---|---|---|
| 2,324,702 | Hoffmann | July 20, 1943 |
| 2,686,374 | Niiranen | Aug. 17, 1954 |
| 2,752,697 | Lawall | July 3, 1956 |